March 21, 1933.　　　A. E. ANDERSON　　　1,902,483
AUTOMATIC RECLOSING CIRCUIT BREAKER SYSTEM
Filed Aug. 10, 1928
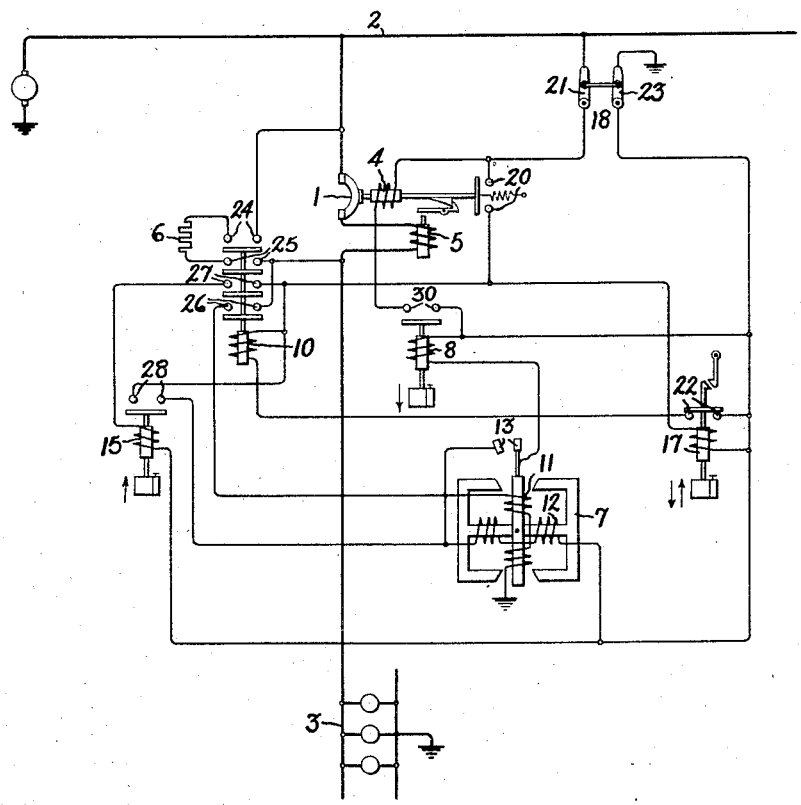
Inventor:
Arvid. E. Anderson;
by Charles E. Mullan
　　　His Attorney.

Patented Mar. 21, 1933

1,902,483

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

AUTOMATIC RECLOSING CIRCUIT BREAKER SYSTEM

Application filed August 10, 1928. Serial No. 298,684.

My invention relates to automatic reclosing circuit breaker systems of the type in which an indicating current is supplied to the load circuit when the circuit breaker is open and in which the reclosing of the breaker is effected in response to a predetermined electrical condition which varies with the load resistance when the circuit breaker is open, such for example as the voltage across the load circuit.

My invention is particularly applicable to automatic reclosing circuit breaker systems which are used in a system of distribution for electric railways such for example as subways. In such systems of distribution, the load indicating current, in case of a wreck, which produces a short-circuit, may cause considerable damage and havoc if it is supplied to the load circuit indefinitely.

One object of my invention is to provide an improved arrangement whereby the automatic reclosing arrangement is prevented from effecting the reclosing of the circuit breaker and the load circuit is isolated from the supply circuit if the circuit breaker is not reclosed within a predetermined time interval after it is opened.

My invention will be better understood from the following description taken in connection with the accompanying drawing, which is a diagram of an automatic reclosing circuit breaker system embodying my invention, and its scope will be pointed out in the appended claims.

Referring to the drawing, 1 represents a circuit breaker which connects a direct current supply circuit 2 to a load circuit 3. The circuit breaker 1 may be of any suitable type examples of which are well known in the art. As shown in the drawing, circuit breaker 1 is of the well known latched-in type and is provided with a closing coil 4 which when energized effects the closing of the circuit breaker and an overload trip coil 5 which when energized a predetermined amount effects the opening of the circuit breaker. The overload trip coil 5 may be connected in any suitable manner so that it is energized in accordance with the current flowing through the circuit breaker 1 when it is closed. As shown in the drawing the overload trip coil 5 is connected in series with the supply and load circuits when the circuit breaker 1 is closed.

After the circuit breaker 1 has been opened by an overload on the load circuit 3, the circuit breaker is arranged to be reclosed automatically when the resistance of the load is greater than a predetermined value. In order to obtain an indication of the load resistance while the circuit breaker is open a load indicating resistor 6 is connected in series between the supply and load circuits so that a small indicating current is supplied to the load circuit while the circuit breaker 1 is open. This indicating current produces a voltage drop across the load circuit which varies with the load resistance. The voltage across the load circuit, therefore, is an indication of the load resistance and, in the arrangement disclosed in the drawing, is used to control the operation of a reclosing relay 7 which in turn effects the energization of a control relay 8 when the voltage across the load circuit 3 is above a predetermined value. The control relay 8 when energized completes the circuit of the closing coil 4 of the circuit breaker 1 so that the circuit breaker 1 is reclosed when the voltage across the load circuit exceeds a predetermined value. Such arrangements for effecting the reclosing of a circuit in response to the voltage across the load circuit are old and well known in the art.

In the particular arrangement shown in the drawing the load indicating resistor 6 is arranged to be connected in series between the supply and load circuits by means of a relay 10 which is energized when the circuit breaker 1 is open. The reclosing relay 7 is shown as having two windings 11 and 12. The operating winding 11 is arranged to be connected across the load circuit 3 by the relay 10 when it is energized and the other winding 12 which is the magnetizing winding is arranged to be connected across the supply circuit 2. The relay 7 is designed in any suitable manner so that when normal voltage is impressed upon the magnetizing winding 12, the relay does not close its contacts 13 until the voltage impressed upon the operating winding 11 is above a predetermined value. Instead of using a two coil reclosing relay 7 as shown in the drawing it is to be understood that the reclosing relay may be of any other suitable type and construction, examples of which are well known in the art.

In order to prevent the circuit breaker from being reclosed until after the load circuit conditions have had time to reach a steady state after the opening of the circuit breaker 1 due to an overload on the load circuit 3, I provide a suitable time relay 15 which is arranged to be operated in response to the opening of the circuit breaker. Relay 15 is arranged so that after the circuit breaker has been opened a predetermined length of time the circuit of the winding 12 of the relay 7 is completed to render the reclosing relay 7 operative to control the reclosing of the circuit breaker 1 in response to the voltage across the load circuit 3.

In order to render the reclosing apparatus inoperative to reclose the circuit breaker and to effect the opening of the circuit through the load indicating resistor 6 and thereby isolate the load circuit 3 from the supply circuit 2 in case the circuit breaker 1 is not reclosed within a predetermined time after it is opened, I provide a time relay 17 which is arranged to be operated when the circuit breaker is opened. If the circuit breaker 1 remains opened for a predetermined length of time, the time relay 17 operates and effects the deenergization of the relay 10 which in turn effects the opening of the load indicating circuit through the resistor 6 and the deenergization of the windings 11 and 12 of the reclosing relay 7 so that the load circuit 3 is isolated from the supply circuit 2 and the reclosing relay 7 is rendered inoperative to effect the reclosing of the circuit breaker. Preferably the relay 17 is of the lockout type so that it has to be reset manually in order to render the reclosing apparatus operative again to control the reclosing of the circuit breaker. The relay 17 may be arranged so that if its coil is deenergized before the relay reaches its lockout position the relay resets with a slight time delay.

18 is a manually controlled switch whereby the automatic apparatus may be cut out of service at will.

The operation of the arrangement disclosed in the drawing is as follows:

When the circuit breaker 1 is closed and an overload occurs on the load circuit 3, the overload trip coil 5 effects the opening of the circuit breaker. The circuit breaker 1 by closing its auxiliary contacts 20 completes a circuit for the coil of relay 10. This circuit is from one side of the supply circuit through contacts 21 of the switch 18, auxiliary contacts 20 on the circuit breaker 1, coil of relay 10, contacts 22 of relay 17, contacts 23 of the control switch 18 to the other side of the supply circuit. Relay 10 by closing its contacts 24 and 25 connects the load indicating resistor 6 in series between the supply circuit 2 and the load circuit 3 so that a small indicating current is supplied to the load circuit. Relay 10 by closing its contacts 26 connects the winding 11 of the reclosing relay 7 across the load circuit. Since the winding 12 of the relay 7 is deenergized and the voltage across the winding 11 is relatively low, the relay 7 does not operate at this time to close its contacts 13.

Relay 10 by closing its contacts 27 completes a circuit for the time relay 15. This circuit is from one side of the supply circuit through the contacts 21 of the control switch 18, auxiliary contacts 20 on the circuit breaker 1, contacts 27 of the relay 10, coil of the time relay 15, contacts 23 of the control switch 18 to the other side of the supply circuit. After the circuit breaker 1 has remained in its open position for a predetermined length of time, time relay 15 closes its contacts 28 and thereby connects the winding 12 of the reclosing relay 7 and the contacts 20 and 21 in series across the supply circuit 2. The winding 12 of the reclosing relay 7 now has normal voltage impressed thereon and the winding 11 is connected across the load circuit, so that the reclosing relay 7 is in readiness to operate in response to the voltage across the load circuit.

When the resistance of the load circuit increases above a predetermined value, the voltage drop produced across the load circuit by the load indicating current increases to a value sufficient to cause the reclosing relay 7 to close its contacts 13 and complete a circuit for the control relay 8. The circuit of the control relay 8 is from one side of the supply circuit through the contacts 21 of the control switch 18, auxiliary contacts 20 on the circuit breaker 1, contacts 28 of the time relay 15, contacts 13 of the reclosing relay 7, coil of the control relay 8, contacts 23 of the control switch 18 to the other side of the supply circuit. Control relay 8 by closing its contacts 30 connects the closing coil 4 and the contacts 21 and 23 of the control switch 18 in series, across the supply circuit 2 so that the circuit breaker 1 is reclosed and the load circuit 3 is reconnected directly to the supply circuit 2. The circuit breaker 1 by opening its auxiliary contacts 20 effects the deenergization of the relays 7, 8, 10, 15, and 17 so that these devices are restored to their normal position.

If for any reason the overload on the load circuit is not removed within a predetermined time after the circuit breaker 1 is opened the time relay 17 is arranged to effect the deenergization of the control relay 10 which in turn effects the deenergization of the time relay 15 and the windings of the reclosing relay 7. The circuit of the coil of the time relay 17 includes the auxiliary contacts 20 on the circuit 1 and the contacts 21 and 23 of the control switch 18 so that the coil of the relay 17 is energized when the circuit breaker 1 is open and the control switch 18 is closed. If the circuit breaker 1 remains open for a sufficient length of time to permit the time relay 17 to open its contacts 22, the above traced circuit for the coil of the control relay 10 is opened and these contacts are maintained in their open position until the timing relay 17 is reset manually, or by other suitable means. Therefore, whenever the time relay 17 operates it effects the disconnection of the load circuit 3 from the supply circuit 2 and also renders the reclosing relay 7 unresponsive to the voltage of the load circuit 3.

If for any reason, such for example, as a faulty latch, the circuit breaker 1 opens immediately after each reclosure thereof, the time relay 17, due to its time delay reset feature is reenergized before it reaches its normal deenergized position. Consequently after a predetermined number of reclosures under such conditions the relay 17 will move into its lockout position and effect the disconnection of the load circuit 3 from the supply circuit and the deenergization of the windings of relay 7 in the manner above described.

While I have in accordance with the patent statutes shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a supply circuit, a load circuit, a circuit breaker connecting said circuits together, overload responsive means for opening said circuit breaker, a resistor, a reclosing relay having an operating winding, means responsive to the opening of said circuit breaker for connecting said resistor in series between said circuits and for connecting said operating winding to said load circuit so that energization of the operating winding varies in accordance with amount of the load connected to said load circuit, and means for preventing the subsequent reclosure of said circuit breaker including a timing device responsive to the opening of said circuit breaker for disconnecting said winding from said load circuit after said circuit breaker has remained open for a predetermined time.

2. In combination, a supply circuit, a load circuit, a circuit breaker connecting said circuits together, overload responsive means for opening said circuit breaker, a resistor, a reclosing relay having an operating winding, means responsive to the opening of said circuit breaker for connecting said resistor in series between said circuits and for connecting said operating winding to said load circuit so that energization of the operating winding varies in accordance with the amount of the load connected to said load circuit, and means for preventing the subsequent reclosure of said circuit breaker including a timing device responsive to the opening of said circuit breaker for disconnecting said resistor from in series between said circuits and for disconnecting said winding from said load circuit after said circuit breaker has remained open for a predetermined time.

3. In combination, a supply circuit, a load circuit, a circuit breaker connecting said circuits together, overload responsive means for opening said circuit breaker, a resistor, a reclosing relay having an operating winding, means including an electroresponsive device for connecting said resistor in series between said circuits and said operating winding across said load circuit, means responsive to the opening of said circuit breaker for effecting the energization of said electro-responsive device, and means for preventing the subsequent reclosure of said circuit breaker including timing means responsive to the position of said circuit breaker for effecting the deenergization of said electroresponsive device to disconnect said resistor from in series between said circuits and said winding from across said load circuit if said circuit breaker remains in its open position for a predetermined time.

4. In combination, a supply circuit, a load circuit, a circuit breaker connecting said circuits together, overload responsive means for opening said circuit breaker, a resistor, a reclosing relay, means responsive to the opening of said circuit breaker for connecting said resistor in series between said circuits after the opening of said circuit breaker, timing means responsive to connection of said resistor in circuit for effecting the connection of a circuit for said relay across said load circuit, and means for preventing the subsequent reclosure of said circuit breaker including other timing means responsive to the position of said circuit breaker for disconnecting said resistor from between said circuits and said circuit for said relay from across said load circuit if said circuit breaker remains in its open position for a predetermined time.

5. In combination, a direct current supply circuit, a direct current load circuit, a circuit breaker connecting said circuits together, means for opening said circuit breaker, reclosing means for said circuit breaker including a resistor in series between said circuits when said circuit breaker is open and a relay having a winding connected across the load circuit, and timing means responsive to the position of said circuit breaker for isolating said circuits from each other and for disconnecting said relay winding from across said load circuit so as to render said reclosing means inoperative to reclose said circuit breaker when said circuit breaker remains open for a predetermined time.

In witness whereof I have hereunto set my hand this 6th day of August, 1928.

ARVID E. ANDERSON.